US 6,629,673 B2

(12) United States Patent
Casillas et al.

(10) Patent No.: US 6,629,673 B2
(45) Date of Patent: Oct. 7, 2003

(54) ADAPTABLE SOLID-HYBRID ROCKET FOR CREW ESCAPE AND ORBITAL INJECTION PROPULSION

(75) Inventors: Eduardo D. Casillas, San Jose, CA (US); Scott E. Lowther, Hollister, CA (US); Glenn F. Sander, San Jose, CA (US); Andrew S. Perrucci, San Jose, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/996,532

(22) Filed: Nov. 28, 2001

(65) Prior Publication Data

US 2003/0098395 A1 May 29, 2003

(51) Int. Cl.[7] .............................. F02K 9/28; B64G 1/40
(52) U.S. Cl. .......................................... 244/172; 60/251
(58) Field of Search .............................. 244/172, 158 R; 239/265.37, 265.19; 60/233, 235, 241, 242, 250, 251, 256

(56) References Cited

U.S. PATENT DOCUMENTS

| 3,136,119 A | * | 6/1964 | Avery |
| 3,178,885 A | * | 4/1965 | Loughran |
| 3,274,771 A | * | 9/1966 | Lieberman et al. |
| 3,430,445 A | * | 3/1969 | Smith |
| 3,488,950 A | * | 1/1970 | Blackman et al. |
| 3,698,192 A | * | 10/1972 | Le Febvre |
| 3,855,789 A | * | 12/1974 | Platzek |
| 4,478,040 A | * | 10/1984 | Johnson |
| 5,572,864 A | * | 11/1996 | Jones |
| 5,579,636 A | * | 12/1996 | Rosenfield |
| 5,582,001 A | * | 12/1996 | Bradford et al. |

* cited by examiner

Primary Examiner—Tien Dinh
(74) Attorney, Agent, or Firm—Bachman & LaPointe, P.C.

(57) ABSTRACT

The present invention relates to a propulsion system for transporting a crew transfer vehicle. The propulsion system has a casing which defines a chamber, a solid propellant system positioned within the chamber for generating one of emergency escape propulsion during an emergency portion of an ascent flight and orbital injection propulsion during normal flight operations, and a sustain propulsion system communicating with the chamber for sustaining one of the emergency escape propulsion during the emergency portion of the ascent flight and orbital injection propulsion during the normal flight operations. In one embodiment of the present invention, the sustain propulsion system comprises a hybrid solid fuel grain and liquid oxidizer system. In a second embodiment of the present invention, the secondary propulsion system comprises a liquid fuel and liquid oxidizer system.

21 Claims, 2 Drawing Sheets

ADAPTABLE SOLID-HYBRID ROCKET FOR CREW ESCAPE AND ORBITAL INJECTION PROPULSION

BACKGROUND OF THE INVENTION

The present invention relates to an adaptable solid hybrid rocket system which combines solid and hybrid propulsion for providing emergency escape propulsion or orbital injection propulsion to a reusable spacecraft such as a manned spacecraft.

Future generations of space vehicles will have a manned crew transfer vehicle which rides on a reusable launch vehicle. The crew transfer vehicle may be injected into orbit to eventually dock with a space station. The crew transfer vehicle requires a crew escape system to supply propulsion and control for the crew to escape from the reusable launch vehicle, as directed by a health monitoring system, under each and all reusable launch vehicle ascent flight phases.

The crew escape system must be capable of very rapid crew transport away from impending danger. The time period from health monitor sensing of a problem to the crew escape system fire-signal may be on the order of one second. Consequently, the crew escape system propulsion must provide very high thrust coupled to very high control maneuverability immediately upon command. High thrust is needed for the first few seconds and must be followed by a longer period of sustained propulsion. Previous propulsion applications with a similar set of requirements have always depended on solid rocket propulsion to generate immediate/very high thrust. Alternate propulsion systems, i.e. liquids, hybrids, gels, require significantly longer time duration to achieve steady-state thrust, and do not achieve the high thrust/weight ratios inherent to solid rockets.

A properly designed and produced reusable launch vehicle/crew transfer vehicle will not experience the type of failure that would require a crew escape system very often, perhaps 0.1% of the time. Consequently, a crew escape system solid propulsion system would in theory be used only rarely. Furthermore, the crew transfer vehicle requirement to minimize explosives, while docked with a space station, does not allow a solid propulsion system onboard. Jettisoning the crew escape system solid propulsion system after all potential escape situations have subsided, and prior to orbital injection, clearly represents an inefficient and expensive approach, as in 99.9% of the time, the solid propulsion system would be thrown away having served no function.

Therefore, a launch vehicle is needed which has a propulsion system which generates immediate, high thrust and has control maneuverability, and which also is used as part of every mission prior to orbital injection and/or space station docking.

SUMMARY OF THE INVENTION

Accordingly, it is an object of the present invention to provide an adaptable solid-hybrid rocket propulsion system.

It is a further object of the present invention to provide a propulsion system which maintains the high thrust and maneuverability required for crew escape system operations and incorporates propulsion flexibility to support orbital injection propulsion as part of each mission.

It is yet a further object of the present invention to provide a propulsion system as above wherein a flight crew is not exposed to the high acceleration required for escape on each and every mission.

The foregoing objects are attained by the adaptable solid-hybrid rocket propulsion system of the present invention.

In accordance with the present invention, a rocket propulsion system broadly comprises a casing defining a chamber, a solid propellant system positioned within the chamber for generating one of escape propulsion during an emergency portion of an ascent flight and orbital injection propulsion during normal flight operations and a sustain propulsion system communicating with the chamber for sustaining the emergency escape propulsion during said emergency portion of the ascent flight and orbital injection thrust during the normal flight operation. The secondary propulsion system may be a hybrid solid fuel grain and liquid oxidizer system or a liquid fuel and liquid oxidizer system.

Other details of the adaptable solid-hybrid rocket propulsion system for crew escape and orbital injection propulsion, as well as other objects and advantages attendant thereto, are set forth in the following detailed description and the accompanying drawings wherein like reference numerals depict like elements.

DETAILED DESCRIPTION OF THE PREFERRED EMBODIMENT(S)

In accordance with the present invention, an adaptable solid-hybrid rocket propulsion system 10 is provided which integrates solid and hybrid propulsion in a multi-mission adaptable configuration capable of providing emergency escape propulsion during an emergency portion of an ascent flight, or orbital injection propulsion during normal ascent flight operation. The propulsion system 10 may be used to launch manned or unmanned space vehicles.

Figure 1:
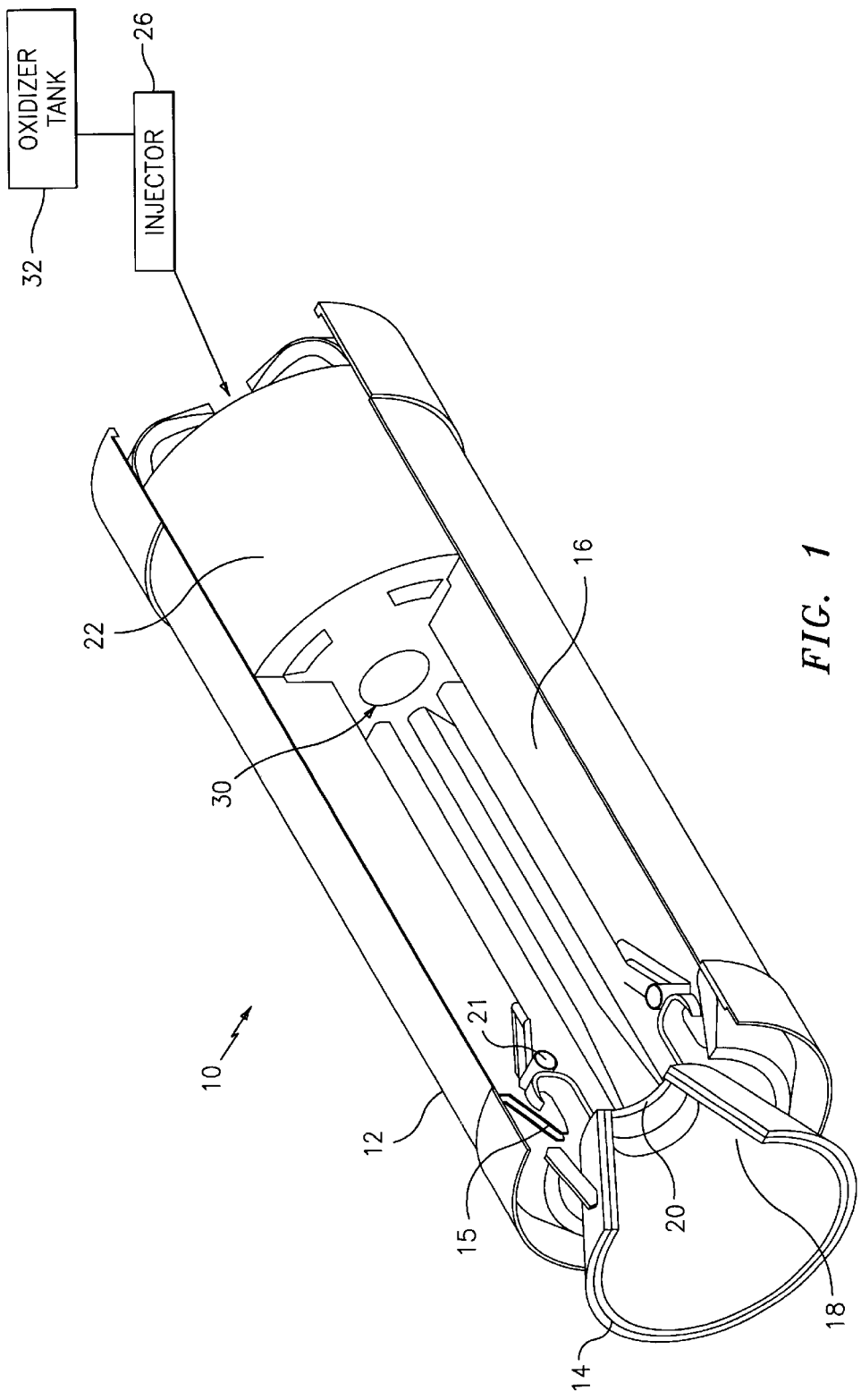
FIG. 1 is a sectional view of a first embodiment of a propulsion system in accordance with the present invention.

Referring now to FIG. 1, a propulsion system 10 in accordance with one embodiment of the present invention is illustrated. The propulsion system 10 includes an outer casing 12 and a thrust nozzle 14. The outer casing 12 may be formed from any suitable material known in the art such as a lightweight, high strength composite material. The thrust nozzle 14 is mounted to the casing 12 and provides variable thrust control vector and slew rate, and thus control maneuverability, during operation. Any suitable means known in the art may be used to mount the thrust nozzle 14 to the casing 12. In a preferred embodiment, a fluid bearing 15 is used to make the nozzle movable. A fluid bearing is desirable to minimize the load required for pivoting and maximizing achievable thrust vector control angle and slew rate. The movable nozzle approach contemplated herein results in high crew escape system maneuverability and also allows electromechanical control actuation of the thrust nozzle 14.

The propulsion system 10 has a solid propellant element 16 within the casing 12. The solid propellant element 16 may be formed from any suitable solid propellant known in the art which may be expended quickly to support escape operations or slowly to support orbital injection operations. In the present invention, the thrust generated by the solid propellant element 16 is advantageously controlled via a nozzle throat area change. The nozzle throat area change may be accomplished using any suitable means known in the art; however, it is preferred to use an ejectable booster nozzle nozzle liner 18 to change the throat area 20. The nozzle liner 18 may be relatively thick and thus reduces the throat area 20 of the nozzle during escape boost thrust, thus generating a desirable high burst acceleration. If escape operations are no longer necessary during the ascent portion of the vehicle's flight, the nozzle liner 18 may be ejected to increase the throat area 20 of the nozzle, thus enabling sustain-thrust during a normal orbital injection phase of the ascent flight. Ejection of the nozzle liner 18 may be accomplished in any suitable manner known in the art.

A consumable igniter 21, such as torroidally shaped igniter, is positioned adjacent an end of the solid propellant element 16 near the thrust nozzle 14. The igniter 21 when ignited commences the burning of the solid propellant element 16. Any suitable means known in the art may be used to ignite the igniter 21.

As previously mentioned, the propulsion system 10 includes a sustain propulsion system. In one embodiment of the present invention, the sustain propulsion system includes a hybrid solid fuel grain 22 which provides sustain thrust for either escape operations or continued sustain-thrust for orbital injection operations. Any suitable hybrid solid fuel grain known in the art, such as a hydroxyl-terminated polybutadiene, may be used to form the solid fuel grain 22.

To ignite the solid fuel grain 22, a liquid oxidizer may be supplied to the motor chamber 30 within the casing 12. The liquid oxidizer is preferably stored in a tank 32 external to the casing 12 and fed to the motor chamber 30 using any suitable oxidizer injection system 26 known in the art.

In a typical operation of the propulsion system 10, the solid fuel grain 22 begins to burn when the solid propellant element 16 has been nearly consumed. This allows a continuation of the emergency escape propulsion force or the orbital insertion propulsion force being generated by the solid propellant element 16. The use of a solid hybrid propulsion fuel grain 22 for sustain-thrust minimizes the solid propellant required for the element 16 and provides a shutdown capability.

While it is preferred to locate the liquid oxidizer tank 32 external to the propulsion system 10, the tank 32 could be located within the propulsion system 10 if desired.

Figure 2:
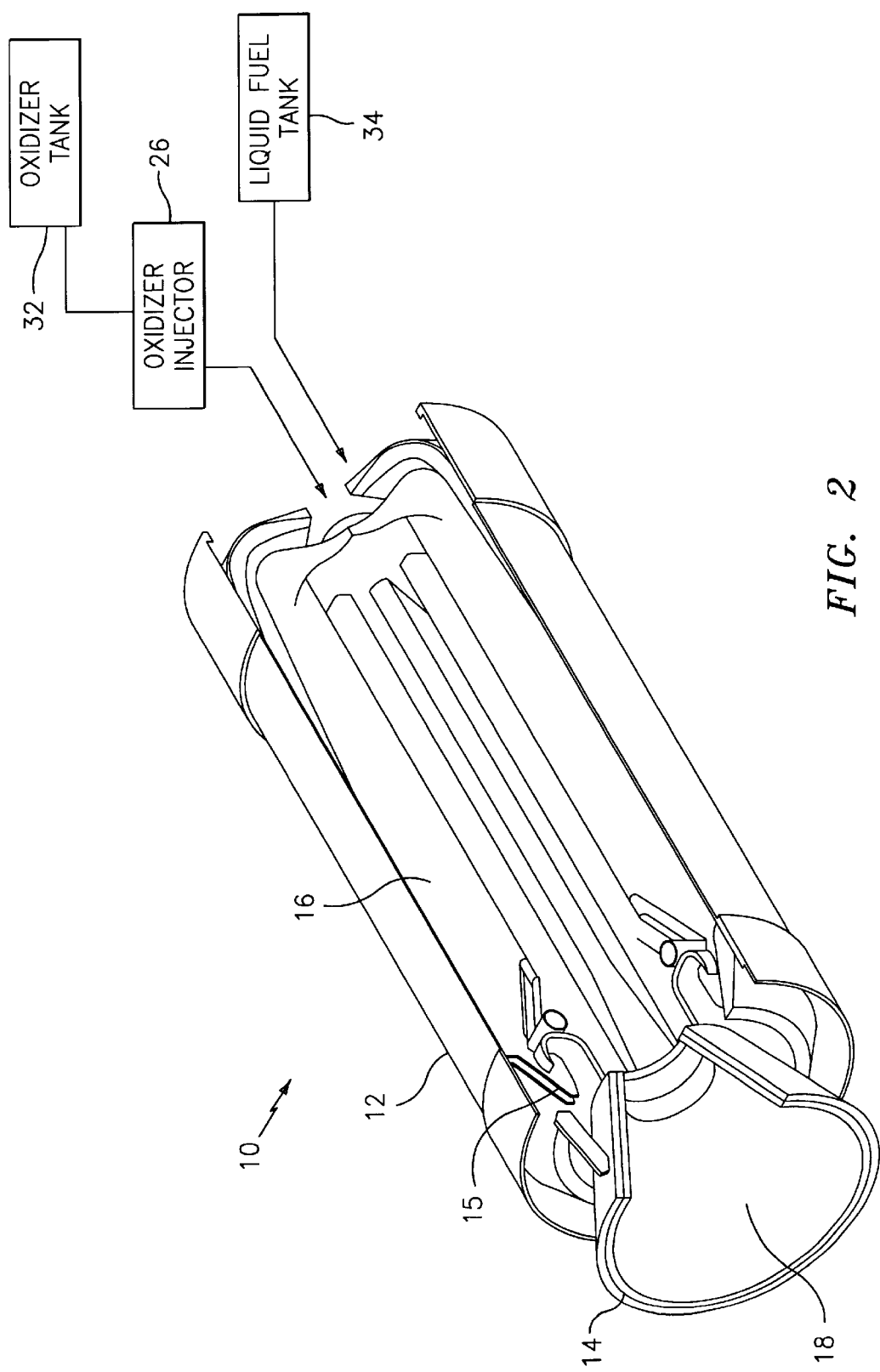
FIG. 2 is a sectional view of an alternative embodiment of a propulsion system in accordance with the present invention.

In an alternative embodiment of the present invention, as shown in FIG. 2, the sustain propulsion system comprises a liquid propulsion system 24 using liquid fuel in lieu of the hybrid solid fuel grain 22 to provide thrust requirements following consumption of the solid propellant element 16. In this embodiment, the liquid fuel is stored in a tank 34 external to the propulsion system 10 and is fed to the chamber 30 in the casing 12. As before, a liquid oxidizer for initiating combustion of the liquid fuel is stored in an external tank 32 and is fed to the chamber 30 as needed to be mixed with the liquid fuel. The liquid fuel and liquid oxidizer feeds may be commenced as the solid propellant element 16 nears complete consumption so that escape operation thrust or orbital insertion thrust can be sustained.

While it is preferred to position the liquid oxidizer tank and the liquid fuel tank external to the propulsion system 10, they could both be located within the propulsion system 10 if desired.

If desired, the oxidizer could be made common to other crew transfer vehicle propulsion systems such as the orbital maneuvering system and the reaction control system. This yields a highly integrated, flexible, and cost-effective propulsion system.

As can be seen from the foregoing description, the adaptable solid-hybrid rocket propulsion system of the present invention maintains the high thrust and maneuverability required for crew escape system operations and incorporates propulsion flexibility to support orbital injection propulsion (low thrust) as part of each mission so that the solid propellant element 16 is expended away during orbit injection. The propulsion system also integrates hybrid propulsion to provide sustain thrust for escape operations during ascent flight or continued sustain thrust propulsion for orbital injection for all routine missions. The inclusion of a hybrid system further results in the availability of a liquid oxidizer that can be used for other crew transfer vehicle propulsion systems.

Using the solid propellant element 16 in the propulsion system 10 of the present invention on each mission reduces propulsion requirements on other reusable launch vehicle propulsion systems and eliminates space station exposure to crew transfer vehicle solid propellant explosive when docked. Further, the solid propellant element may be used so that a crew is not exposed to high acceleration, required for escape, on each and every mission.

It is apparent that there has been provided in accordance with the present invention an adaptable solid-hybrid rocket for crew escape and orbital injection propulsion which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. A propulsion system comprising:

a casing defining a chamber;

a solid propellant system positioned within said chamber for generating one of emergency escape propulsion during an emergency portion of an ascent flight and orbital injection propulsion during normal flight operation;

a sustain propulsion system communicating with said chamber for sustaining one of said emergency escape propulsion during said emergency portion of said ascent flight and orbital injection propulsion during said normal flight operations, said sustain propulsion system beginning operation as said solid propellant system nears an end to its operation; and said sustain propulsion system comprising a hybrid solid fuel grain and a liquid oxidizer for providing one of sustain thrust during said emergency portion of the ascent flight and sustain thrust during said normal flight operations.

2. A propulsion system according to claim 1, wherein said solid hybrid fuel grain is positioned within said chamber.

3. A propulsion system according to claim 2, wherein said liquid oxidizer is located within a tank external to the propulsion system and fed to the chamber via an injection system.

4. A propulsion system comprising:

a casing defining a chamber;

a solid propellant system positioned within said chamber for generating one of emergency escape propulsion during an emergency portion of an ascent flight and orbital injection propulsion during normal flight operations;

a sustain propulsion system communicating with said chamber for sustaining one of said emergency escape propulsion during said emergency portion of said ascent flight and orbital injection during said normal flight operations, said sustain propulsion system beginning operation when said solid propellant system nears an end of its operation; and said sustain propulsion system comprising a liquid fuel and liquid oxidizer propulsion system for providing one of sustain thrust during said emergency portion of said ascent flight and sustain thrust during said normal flight operation.

5. A propulsion system according to claim 4, wherein said liquid fuel is stored in a tank external to said propulsion system and said liquid oxidizer is stored in a tank external to said propulsion system and wherein said liquid fuel and liquid oxidizer are fed to the chamber.

6. A propulsion system comprising:

a casing defining a chamber;

a solid propellant system positioned within said chamber for generating one of emergency escape propulsion during an emergency portion of an ascent flight arid orbital injection propulsion during normal flight operations;

a sustain propulsion system communicating with said chamber for sustaining one of said emergency escape propulsion during said emergency portion of said ascent flight and orbital injection propulsion during said normal flight operations:

a thrust nozzle;

said solid propellant system including a solid propellant element;

a solid propellant igniter positioned adjacent a thrust nozzle end of said solid propellant element; and said igniter comprising a consumable torroidal igniter.

7. A propulsion system according to claim 6, further comprising a fluid bearing movable nozzle for providing a variable thrust vector control angle and a variable slew rate.

8. A propulsion system according to claim 7, wherein said fluid bearing movable nozzle is joined to said casing by a fluid bearing.

9. A propulsion system according to claim 7, further comprising means for reducing a throat area of said nozzle.

10. A propulsion system comprising:

a casing defining a chamber;

a solid propellant system positioned within said chamber for generating one of emergency escape propulsion during an emergency portion of an ascent flight and orbital injection propulsion during normal flight operations;

a sustain propulsion system communicating with said chamber for sustaining one of said emergency escape propulsion during said emergency proportion of said ascent flight and orbital injection propulsion during said normal flight operation;

a fluid bearing movable nozzle for providing a variable thrust vector control angle and a variable slew rate;

means for reducing a throat area of said nozzle; and said throat area reducing means comprising an ejectable nozzle liner which decreases the throat area during said emergency portion of said ascent flight and upon ejection increases the throat area to allow a sustain propulsion force during said normal operation.

11. A propulsion system comprising:

a casing;

a movable nozzle joined to said casing for providing a variable thrust vector control angle;

a solid propellant element within said casing for generating one of an emergency escape propulsion force and an orbital insertion propulsion force;

a sustain propulsion system for sustaining one of said emergency escape propulsion force and said orbital insertion propulsion force after said solid propellant element has been consumed: and an ejectable nozzle liner positioned within the nozzle to reduce the throat area of the nozzle.

12. A propulsion system according to claim 11, further comprising a consumable igniter positioned adjacent a nozzle end of said solid propellant element.

13. A propulsion system according to claim 11, further comprising said nozzle liner being ejected after a need for emergency escape has passed.

14. A propulsion system according to claim 11, wherein said sustain propulsion system comprises a hybrid solid fuel grain within the casing and a liquid oxidizer fed into a motor chamber within the casing.

15. A propulsion system according to claim 14, wherein said liquid oxidizer is stored in a tank external to said propulsion system.

16. A propulsion system according to claim 11, wherein said sustain propulsion system comprises a liquid fuel and a liquid oxidizer.

17. A propulsion system according to claim 16, wherein said liquid fuel is stored in a first tank external to said propulsion system and said liquid oxidizer is stored in a second tank external to said propulsion system.

18. A propulsion system comprising:

a casing;

a thrust nozzle mounted to said casing, said thrust nozzle having a throat area;

an ejectable nozzle liner within said thrust nozzle for reducing said throat area;

a solid propellant element within said casing for generating a propulsive force during normal orbital insertion operation of said propulsion system and during emergency escape operation; and a sustain propulsion system for generating a sustaining propulsive force during said normal orbital insertion operation and during said emergency escape operation after said solid propellant element has been consumed.

19. A propulsion system according to claim 18, wherein said ejectable nozzle liner is ejected from said nozzle after a need for emergency escape operation has passed.

20. A propulsion system according to claim 18, wherein said sustain propulsion system comprises a hybrid solid fuel grain within said casing and a liquid oxidizer.

21. A propulsion system according to claim 18, wherein said sustain propulsion system comprises a liquid fuel and liquid oxidizer system.

* * * * *